United States Patent [19]

Saylak

[11] Patent Number: 4,769,288

[45] Date of Patent: Sep. 6, 1988

[54] SULFUR-COATED ASPHALT PELLETS

[75] Inventor: Donald Saylak, Bryan, Tex.

[73] Assignee: The Texas A & M University System, College Station, Tex.

[21] Appl. No.: 39,004

[22] Filed: Apr. 15, 1987

[51] Int. Cl.$^4$ .................. B32B 5/11; C08L 91/06
[52] U.S. Cl. ........................ 428/403; 106/273 R; 106/274; 208/22; 208/39; 427/212
[58] Field of Search ............ 106/274, 273 R, DIG. 7; 428/403; 264/7; 425/DIG. 101; 427/212, 213.31; 208/22, 39, 44; 404/91, 92

[56] References Cited

U.S. PATENT DOCUMENTS

| | | | |
|---|---|---|---|
| 2,519,891 | 8/1950 | Dean et al. | 428/403 |
| 2,978,351 | 4/1961 | Pullar | 428/403 |
| 3,001,228 | 9/1961 | Nack | 18/2.7 |
| 3,026,568 | 3/1962 | Moar | 18/47.2 |
| 3,958,067 | 5/1976 | Takase et al. | 428/402 |
| 3,970,468 | 2/1976 | Garrigues et al. | 106/274 |
| 4,024,076 | 5/1977 | Miyake et al. | 106/274 |
| 4,154,619 | 5/1979 | Pronk | 106/274 |
| 4,239,547 | 12/1980 | McBee et al. | 106/274 |
| 4,283,231 | 8/1981 | Clementoni et al. | 106/274 |
| 4,298,397 | 11/1981 | Burris | 106/274 |

OTHER PUBLICATIONS

Article "Asphalt", *Encyclopedia of Chemistry*, 3d. ed., pp. 110–113 Van Nostrand Reinhold Co.
Sulfur: New Sources and Uses, Chap. 11, *Advances in Chemistry Series* No. 183, American Chemical Society 1982.
Article "TTI's Sulfur-Asphalt Research", *Texas Transportation Researcher*, 8-86, vol. 22 #3, p. 2.
Article "Sulfur-Asphalt Pellets Invented: Safe and Cost-Effective Method of Making Asphalt Concrete", *Texas Transportation Researcher*, 8-86, vol. 22 #3, p. 1.
"M&M Candies Inspire New Form of Asphalt", *Civil Engineering*, Aug., 1986, p. 22.

*Primary Examiner*—George F. Lesmes
*Assistant Examiner*—James B. Monroe
*Attorney, Agent, or Firm*—Arnold, White & Durkee

[57] ABSTRACT

A new composition is disclosed which comprises pellets of asphalt coated with a solid layer of sulfur. The sulfur shell provides a meltable container for the asphalt core while protecting it from contact with the atmosphere. The relative quantities of sulfur and asphalt in the pellets of the invention may be varied over a wide range to provide sulfur-to-asphalt ratios commonly used in both sulfur-asphalt-sand mixes and sulfur-extended asphalt binders. The advantages of pelletizing are virtual elimination of the danger of dealing with hot materials and significant reduction in energy costs associated with keeping asphalt and sulfur hot and pumpable. To produce an asphalt paving mix, the sulfur-coated asphalt pellets may simply be mixed with heated aggregate.

15 Claims, No Drawings

SULFUR-COATED ASPHALT PELLETS

BACKGROUND OF THE INVENTION

1. Field of the Invention

This invention relates to asphalt concretes. More particularly, it relates to sulfur-extended asphalt mixtures and sand-asphalt-sulfur systems used for paving and the like.

2. Description of the Related Art

The presence of sulfur in asphaltic mixtures provides improved compaction and strength benefits which improve the durability and performance of the composition as a paving material. Research into the use of sulfur in asphalt paving materials has resulted in the development of two distinct technologies whose basic difference lies in the primary role sulfur plays in the mixture. The first development was Sand-Asphalt-Sulfur (SAS) which involves the use of sulfur as a structuring agent with poorly graded sands to produce a quality asphaltic paving material (i.e., the role of the sulfur is that of aggregate). Sulfur-Extended-Asphalt (SEA) is a later development in which sulfur is utilized as in integral part of the binder to effect a partial replacement or extension of the asphalt cement in conventional asphaltic pavement materials. These two distinct uses of sulfur in asphaltic mixtures are discussed at length in a review article by W. J. Rennie in "Sulphur Asphalts", New Uses for Sulphur—SUDIC Technology Series No. 2, 2nd ed., 1979.

The preparation of SAS materials involves a two cycle process. The operation begins with all three ingredients—aggregate, asphalt, and sulfur—preheated to a temperature above the melting point of sulfur (240° F.) and below 300° F. The upper limit is the temperature above which sulfur begins to undergo an abrupt and very large increase in viscosity which could adversely affect mix workability. Although acceptable mixes have been prepared at temperatures as high as 380° F., 300° F. is considered to be the maximum mix processing temperature for safety reasons since above this temperature, sulfur can emit toxic fumes.

In the first cycle of the preparation of SAS mixtures, aggregate and asphalt are mixed to coat the particles with asphalt. Liquid sulfur is then added and mixed with the asphalt and aggregate until the three ingredients are dispersed throughout the mix. Upon cooling, the sulfur which has not dissolved in the asphalt solidifies within the voids of the mixture thereby creating a mechanical interlock from which the material derives its strength. By acting as a conforming filler, the crystallized sulfur induces such a high degree of mechanical stability to the mix that high quality paving materials can be achieved using poorly graded aggregates such as single-sized sands. Upon consideration of a number of criteria, it has been concluded that an optimum SAS system would have sulfur and asphalt contents between 12 and 14 percent and 5 and 7 percent, respectively. [D. Saylak and W. E. Conger, "A Review of the State of the Art of Sulfur Asphalt Paving Technology," Sulfur: New Sources and Uses, American Chemical Society Symposium Series, No. 183, pp. 155–193 (1982)].

Although commercial processes for modifying properties of asphalts with sulfur have been in existence for more than a century, the current developments in the use of Sulfur Extended Asphalt (SEA) binders originated with the work of Bencowitz and Boe in 1938 ["Effect of Sulphur Upon Some of the Properties of Asphalts", Proceedings of the American Society of Testing Materials, 39 (II), p. 539]. Using a wide variety of types and sources of asphalts, they produced stable blends containing 25 percent sulfur. Blends with as much as 40% sulfur were achieved with some asphalts.

These early studies together with more recent investigations have established some conclusions regarding the effect of sulfur on the properties of SEA binders and the hot-mix concretes in which they are used. Depending upon the temperature and the amount present, sulfur will go into solution with the asphalt, chemically react with the asphalt to form aromatic polysulfides, and form a solid-liquid dispersion with the binder. At binder ratios up to 20:80 (sulfur-to-asphalt), most of the sulfur will be dissolved by the asphalt at blending temperatures between 240° and 300° F. As more sulfur is added, that which does not dissolve in the asphalt will exist in the dispersed phase. Because the specific gravity of sulfur is about twice that of asphalt, the solid sulfur particles will settle out unless the blend is continuously agitated. The rate of settling is dependent on the viscosity-temperature properties of the asphalt.

The engineering properties of mixes prepared with SEA binders vary with sulfur content while maintaining their load bearing characteristics over a wide range of pavement temperatures. However, with sulfur contents in excess of 35 volume percent (52 weight percent), the mixes become sensitive to compaction temperatures below 240° F. At this point the sulfur content becomes significant enough that a mechanical interlocking process similar to that encountered with SAS systems becomes a factor. This is considered the maximum permissible substitution level for normal compaction conditions. At levels below 15 volume percent (26 weight percent), properties are similar to conventional asphalt mixtures.

A sulfur-extended asphalt blend requires a fine, uniform dispersion of the liquid sulfur in asphalt. The basic difference between the techniques for SEA binder preparation used by Bencowitz et al. and those in current use is the emphasis of the latter on high shear rate mixing to generate the desirable sulfur particle size (3 to 10 microns). The size range is consistent with that required to maximize solubility of the sulfur in the asphalt and to enhance long term stability. The SEA binders produced by Bencowitz were agitated at 325 rpm for 2 hours, whereas the latest methodology relies on colloid mills, emulsifiers, turbines, homogenizers, in-line mixers, or combinations of the above. In all of the above methods the sulfur and asphalt are preblended prior to entering the mix plant.

Other investigators have determined that sufficient shearing action can be produced by the interaction between the aggregate and binder during mixing. This method, referred to as direct substitution, requires that the sulfur and asphalt be stored and metered separately into either the weigh buckets or directly into the mixing unit (pugmill or drum mixer). The direct mixing method requires no special equipment in the field for SEA binder preparation. On the other hand a number of uniquely designed processing units have been developed for preblending sulfur and asphalt.

Since sulfur has about twice the unit weight of asphalt, a given weight of sulfur occupies ½ the volume of an equal weight of asphalt. Early mix design procedures evolved on the basis of an equal volume substitution of sulfur for asphalt (i.e., a S:A substitution weight ratio of 2 to 1). However, construction experience in the United States and Canada indicates that, due to the improved aggregate coating capability provided by the lower viscosity of SEA binders, substitution weight ratios as low as 1.4 to 1 may be feasible. An added benefit is also realized from the structuring effect provided by the undissolved sulfur particles in high-sulfur binders. The Bureau of Mines has published a guideline manual which provides detailed treatment of mix design and construction procedures for the preparation of SEA binders. [W. C. McBee et al., "State-of-the-Art Guidelines for Design, Quality control and Construction of Sulfur-Extended Asphalt (SEA) Pavements"]. This manual provides a formula for establishing the equivalent SEA binder content to replace, on an equal volume basis, the asphalt in a conventional asphaltic concrete mix design.

Throughout its development, the use of sulfur in highway paving mixtures has raised questions regarding the pollutants generated, their environmental impact, and worker safety considerations associated with mix preparation and placement. Evolved gas analyses have been incorporated into a number of field trials in Canada and the United States. Except for two instances when paver screed temperatures exceeded 320° F., all emissions were found to be below the maximum allowable. In general, it has been concluded that as long as hot sulfur paving mixtures do not exceed 300° F., the emission levels of all sulfur-containing species ($H_2S$, $SO_2$, $SO_3$ and organo-sulfur compounds) will be below their respective Maximum Allowable Concentrations.

Whether SEA mixes are prepared by the preblending method or the direct substitution method, supplies of both molten sulfur and molten asphalt are required. This results in significant energy demands especially when supplies of these two materials must be maintained at the ready. There are also obvious safety hazards attendant in storing and handling such molten substances. As mentioned above, temperature control is particularly critical in the case of molten sulfur inasmuch as toxic fumes may be generated if the temperature is allowed to go too high.

A granular asphalt is described in U.S. Pat. No. 3,958,067 to Takase et al. The granules are in the shape of a polyhedron having at least one acute angle and are less than about 10 mm in size. The granules are produced in the apparatus described in U.S. Pat. No. 3,758,035. It is said that the claimed granular asphalt can be melted rapidly and easily without causing thermal decomposition, denaturing, or air pollution.

A method for producing coated bitumen pellets is described in U.S. Pat. No. 3,026,568 to Moar. The purpose of achieving the granular form is to permit the bitumen to be handled in the manner of a granulated material. It is said that in converting bitumen, whether asphalt or coal tar, into the form of finely divided pellets, granules, or droplets, it is an essential requirement to coat the pellets with an appropriate powdered mineral so as to prevent the pellets from adhering to one another. Suitable coating materials are said to be several finely ground minerals, among which are limestone, Portland cement, clay, mineral flour, and diatomaceous earth. Molten asphalt is sprayed from nozzles downwardly into an upwardly directed stream of air carrying the powdered coating material. This is said to atomize the bitumen into fine pellets and initially coat and partially cool the same to a semi-molten state. The initially coated pellets are then passed through a second zone of swirling air carrying the coating material to acquire additional coating.

U.S. Pat. No. 3,001,228 to Nack relates to production of coated solid pellets of fusible materials. Asphalt is among the suitable fusible materials listed. The process comprises forming molten droplets of the fusible material and introducing the molten droplets into a fluidized bed of finely divided coating solids. Included among the suitable finely divided coating solids are clays, natural and synthetic resins, limestone, fertilizer materials, talc, diatomaceous earth, zein, and calcium carbonate. The product of the claimed process consists of substantially spherical, coated droplets of the fusible material having a coating of discrete solid particles of finely divided coating solids adhering thereto.

SUMMARY OF THE INVENTION

Asphalt pellets are encapsulated with a layer of molten sulfur which is then cooled and hardened. Optionally, an outer layer of a latex or similar elastomer may be applied to reduce the possibility of chipping the hardened sulfur coating of the pellets during routine handling operations.

As used herein the term "pellet" is used only to mean a discrete body of material. No single shape or configuration is contemplated. Rather, the sulfur-coated asphalt pellets of the present invention may be produced in almost any desired size and shape. If the asphalt pellets are formed by an extrusion process, they will most commonly be of cylindrical shape. If they are made by spraying, they will more likely be approximately spherical.

The thickness of the sulfur covering and the size of the asphalt pellets may be independently adjusted to provide a wide range of sulfur-to-asphalt ratios. At one extreme, a relatively large pellet of asphalt can be coated with a thin layer of sulfur to essentially provide a pellet of asphalt in a non-sticking, meltable container. In such a case, the fraction of sulfur in the resulting mix would be almost negligible. At the other extreme, a relatively small pellet of asphalt can be coated with a comparatively thick layer of sulfur thereby producing sulfur-to-asphalt ratios in the range commonly used for SAS mixes. Intermediate sulfur-to-asphalt ratios in the range appropriate for SEA systems can readily be had.

The invention provides a means for storing and handling asphalt from the plant to the site where it is to be used which both minimizes energy costs and reduces the safety hazards inherent in handling hot, molten materials.

Encapsulation of asphalt in a meltable shell permits field storage and transporting of asphaltic binders without the need for keeping the asphalt hot and "pumpable" for prolonged periods. Pelletized asphalt can be introduced into asphalt concrete mixes by means of conveyor belts, blowers, or other devices for moving free-flowing solids. The need for special pumps and insulated pipes is thus eliminated. Moreover, metering of the asphalt and sulfur to be used in the mix is facilitated inasmuch as weigh buckets can be used for charging the asphalt pellets to the mixer in the same way that aggregate is commonly charged to the mixer. Asphalt and sulfur densities change with temperature. Thus, when asphalt and/or sulfur are metered by volume, the temperature must be monitored and corrections made for changes in the density of the material. Material handling and equipment requirements are, therefore, reduced by utilizing the asphalt pellets of the present invention.

Encapsulation of asphalt in sulfur minimizes "age hardening" or oxidation of asphalt which commonly occurs when asphalts are heated in the presence of atmospheric oxygen. Encapsulation also permits the asphalt to be preblended with additives and stored in the open without incurring chemical changes due to exposure to the elements. Inasmuch as sulfur is insoluble in water, stockpiles of sulfur-coated asphalt pellets can be maintained in outdoor open bins or other containers without the need for protection from rain or snow.

Providing pellets of asphalt with a coating of sulfur also provides for precise control of sulfur-to-asphalt ratios in SAS and SEA mixes. The sulfur-to-asphalt ratio is determined by the relative sizes of the asphalt core and the sulfur covering of the pellets. This can be carefully controlled during production of the pellets and eliminates the need for separate metering of asphalt binder and sulfur at the mixing site. The sulfurencapsulated asphalt pellets need not be heated at all prior to charging to the mixer. Rather, the aggregate is first heated (as is commonly done to remove moisture) and the coated pellets of asphalt binder are then added to the heated aggregate. Mixing the heated aggregate with the asphalt pellets melts both the outer sulfur layer and the central asphalt core. There is usually sufficient shearing action in the mixer to dissolve the sulfur in the asphalt binder thereby producing a true SEA mixture.

The present invention can be utilized for recycling asphalt pavements including those which have become hard and brittle as a result of oxidation. It is frequently necessary to add rejuvenators such as fluxing agents and/or plasticizers to such asphalt concretes in order to recycle them. Adding sulfur reduces the viscosity of age-hardened asphalts thereby reducing or eliminating the need for rejuvenators.

The sulfur-coated asphalt pellets disclosed herein may simply be added to recycled pavement when it is reheated in the mixer. Given pellets with the appropriate sulfur-to-asphalt ratio, this is the equivalent of adding an SEA binder to old paving material. Alternatively, pieces of old pavement may be first coated with new asphalt and then coated with sulfur. Such coated pieces provide the combined benefits of adding both fresh asphalt and sulfur to the paving mix.

DETAILED DESCRIPTION

Asphalt ("asphaltum"; "mineral pitch"; "Judean pitch"; or, "bitumen") is a bituminous substance resulting from petroleum by evaporation of lighter hydrocarbons and partial oxidation of the residue. Asphalts are black to dark brown highly viscous mixtures of paraffinic, naphthenic and aromatic hydrocarbons together with heterocyclic compounds containing sulfur, nitrogen and oxygen as well as small amounts of metals. These components are now known to cover the molecular weight range of about 300 to 5000, although small amounts of lower molecular weight materials are frequently present. Asphalts are primarily employed in applications which make use of their adhesive qualities, waterproofing ability, relative chemical inertness, and high viscosity at ambient temperatures.

Over 95% of the asphalt used in the United States is produced from petroleum as the residue from vacuum distillation or steam distillation or from vacuum flashing operations. About 4% of the asphalt used occurs in natural deposits. About half the asphalt used for road construction (the "penetration grades") is sufficiently viscous to require heating in order to mix with mineral aggregates. The other half is blended with petroleum fractions such as naphtha, kerosene or furnace oils to yield low viscosity "cutback grades" or is emulsified in water. These products are sufficiently fluid to apply without heating. The hardening of paving asphalts during application and use has been studied extensively as a function of mixing temperature, air content of the compacted mixtures, thickness of the pavement and chemical nature of the asphalt. A simple and rapid laboratory procedure employing a sliding plate microviscometer has been shown to predict accurately, in advance, the hardening from oxidation to be expected over a period of years for paving asphalts in field installations.

Reactions between asphalt and sulfur are known to take place at temperatures above about 350° F. to give products of high molecular weight and low solubility. This is not exactly analogous to the vulcanization of rubber, since olefins usually are not found in asphalts. Rather, the reactions of sulfur with asphalt are similar to those of oxygen, wherein most of the sulfur is released as hydrogen sulfide and only a small part remains. Dehydrogenation-coupling reactions probably are important as in the case of oxygen.

Sulfur-coated asphalt pellets may be prepared simply by dipping a pellet of asphalt into molten sulfur, removing the pellet from the molten sulfur, and allowing the sulfur adhering to the asphalt pellet to cool and solidify. The dipping and cooling may be repeated as many times as needed to achieve the desired thickness of the sulfur coating.

EXAMPLE

To illustrate one particular embodiment of the invention, assume a spherical asphalt core of radius r surrounded by a sulfur shell of thickness s. Thus, the overall configuration of the sulfur-coated asphalt pellet is a sphere of radius r+s. For the purposes of illustration, a spherical shape has been chosen owing to the relative simplicity of such a geometry and the associated mathematics.

Thus, the volume of the asphalt core is:

$$V_a = 4/3 \times \pi \times r^3$$
$$= 4.18879 \times r^3$$

and the volume of the sulfur shell is:

$$V_s = [4.18879 (r + s)^3] - 4.18879 \times r^3$$
$$= 4.18879 [(r + s)^3 - r^3]$$

Most commonly, SEA binders comprise about 30 to 40 weight percent sulfur in the binder and a paving mix using such a binder would comprise approximately 94% aggregate and 6% binder by weight. Given that sulfur is approximately twice as dense as most penetration grade asphalts, a sulfur-coated asphalt pellet designed for use in an SEA application would likely have a nominal sulfur content of 18 volume percent.

If a 1/32"-inch sulfur coating is assumed, using the above equations, it can readily be calculated that a spherical asphalt core having approximately a 0.444-inch radius will provide a coated pellet having a sulfur content of about 18% by volume.

At room temperature, most asphalts are plastic and may be readily formed into pellets by simply rolling the desired quantity between the palms of one's hands. On a production scale, asphalt pellets may be formed by molding, extruding, or by any of the other well-known methods for pelletizing plastic materials.

Inasmuch as most asphalts are quite plastic at room temperature, uncoated pellets of asphalt tend to lose their shape or "slump" upon standing. Thus, it is often desirable to cool the asphalt to below room temperature during pelletization and/or during that period prior to their encapsulation with sulfur.

Encapsulation of the asphalt pellets with sulfur may be accomplished in a variety of ways. As mentioned above, the asphalt pellets may simply be dipped in molten sulfur Alternatively, the pellets may be sprayed with molten sulfur or coated in a mold. The encapsulation techniques employed in the pharmaceutical and candy-making arts should be applicable to the practice of this invention.

The sulfur coating of pellets produced simply by dipping asphalt into molten sulfur is somewhat brittle and can fracture or chip upon impact. It has been found, however, that if the sulfur is cooled rapidly following application to the asphalt pellet the coating acquires a "rubbery" quality and is less prone to chipping and cracking. This may be achieved simply by immersing the pellets in cold water immediately after application of the sulfur.

Alternatively, the sulfur may be plasticized by the incorporation of additives. Most commonly, dicyclopentadiene is used for this purpose, as is well-known in the art.

An additional alternative protective measure is to coat the sulfur-encapsulated asphalt particles with an outer covering of an elastomer such as a latex or the like. This may be sprayed on as the final step in the production process.

Controlled cooling of the coated pellets is desirable inasmuch as the asphalt core will often be below ambient temperature while the sulfur coating is obviously much hotter—initially just below the melting point of sulfur. Thus, the asphalt core is warming (and expanding) while the sulfur coating is cooling (and contracting). This situation can cause the asphalt to ooze from cracks or pores in the sulfur coating. It can be avoided by cooling the coated pellets at a controlled rate so as to minimize temperature-induced expansions and contractions.

The present invention has been particularly set forth above in terms of specific embodiments. It is to be understood that variations upon the invention are now enabled to those skilled in the art by reason of this disclosure, which variations lie within the scope of the present teaching. Accordingly, it is intended that the following claims be interpreted to encompass all such variations.

What is claimed is:

1. A composition comprising a pellet of asphalt covered with a solid layer of sulfur.

2. A composition comprising a central core of asphalt surrounded by a solid, external layer of sulfur.

3. An asphalt paving material prepared by mixing aggregate at a temperature between about 240° F. and about 300° F. with pellets of asphalt coated with sulfur.

4. A process for producing a sulfur-extended asphalt binder comprising:
   melting pellets of asphalt coated with sulfur.

5. A process as recited in claim 4 wherein the pellets are melted by contact with heated aggregate.

6. A composition comprising:
   a central core of asphalt;
   a continuous layer of sulfur surrounding the central core; and,
   an outer layer of a resilient material.

7. A composition as recited in claim 6 wherein the resilient material is an elastomer.

8. A composition as recited in claim 6 wherein the resilient material is a latex.

9. A composition as recited in claim 6 wherein the resilient material has a melting point below 300° F.

10. A method of making an asphalt binder which comprises:
    forming an asphalt into pellets;
    coating the asphalt pellets with molten sulfur; and,
    cooling the molten sulfur-coated pellets to solidify the sulfur coating.

11. The method of claim 10 in which the solidified sulfur-coated pellets are coated with an elastomeric coating.

12. A method of making an asphaltic paving mix which comprises:
    mixing aggregate with pellets of asphalt encapsulated in a shell of sulfur at a temperature and for a time sufficient to melt the pellets and to mix the resulting molten sulfur and asphalt with the aggregate.

13. A method as recited in claim 12 wherein the aggregate is heated prior to mixing with the sulfur-coated asphalt pellets.

14. A method of recycling asphalt concretes which comprises:
    breaking the asphalt concrete into pieces;
    covering the pieces with additional asphalt;
    coating the asphalt-covered pieces with molten sulfur; and,
    cooling the molten sulfur-coated pieces to solidify the sulfur coating.

15. An asphalt paving material prepared by mixing pieces of asphalt concrete at a temperature between about 240° F. and about 300° F. with pellets of asphalt coated with sulfur.

* * * * *